United States Patent
Fumoto et al.

(10) Patent No.: US 7,151,724 B2
(45) Date of Patent: Dec. 19, 2006

(54) DISK RECORDING APPARATUS AND DISK RECORDING METHOD

(75) Inventors: Keigo Fumoto, Tokyo (JP); Yuji Nozawa, Kanagawa (JP); Mamoru Akita, Kanagawa (JP); Fumihisa Tago, Kanagawa (JP)

(73) Assignee: Sony Corporation (JP)

( * ) Notice: Subject to any disclaimer, the term of this patent is extended or adjusted under 35 U.S.C. 154(b) by 517 days.

(21) Appl. No.: 10/228,308

(22) Filed: Aug. 27, 2002

(65) Prior Publication Data

US 2003/0043722 A1 Mar. 6, 2003

(30) Foreign Application Priority Data

Aug. 31, 2001 (JP) .......................... P2001-264638

(51) Int. Cl.
*G11B 7/00* (2006.01)

(52) U.S. Cl. .................... 369/44.38; 369/112.02; 369/116

(58) Field of Classification Search .......... 369/44.13, 369/44.28, 44.37, 195, 116, 121
See application file for complete search history.

(56) References Cited

U.S. PATENT DOCUMENTS

| | | | | |
|---|---|---|---|---|
| 5,031,165 A | * | 7/1991 | Fujita | 369/44.13 |
| 5,043,960 A | * | 8/1991 | Nakao et al. | 369/13.02 |
| 5,365,535 A | * | 11/1994 | Yamaguchi et al. | 369/121 |
| 5,457,670 A | * | 10/1995 | Maeda et al. | 369/44.37 |
| 5,592,444 A | * | 1/1997 | Alon et al. | 369/13.24 |
| 5,608,716 A | * | 3/1997 | Koyama et al. | 369/275.1 |
| 5,671,209 A | * | 9/1997 | Kamioka et al. | 369/44.37 |
| 5,680,376 A | * | 10/1997 | Katayama et al. | 369/47.16 |
| 6,072,762 A | * | 6/2000 | Kume et al. | 369/116 |
| 6,373,809 B1 | * | 4/2002 | Rauch et al. | 369/121 |
| 6,388,966 B1 | * | 5/2002 | Sato et al. | 369/47.16 |

* cited by examiner

*Primary Examiner*—Thang V. Tran
(74) *Attorney, Agent, or Firm*—Rader, Fishman, & Grauer PLLC; Ronald P. Kananen

(57) ABSTRACT

A disk recording apparatus for recording data to a disk includes: a reading and writing element for emitting a read beam onto the disk to read out recorded data therefrom while emitting a plurality of write beams simultaneously onto the disk to record data thereto in parallel; and a controlling element for controlling where to emit on the disk the plurality of write beams in accordance with the data read out by the reading and writing element.

6 Claims, 4 Drawing Sheets

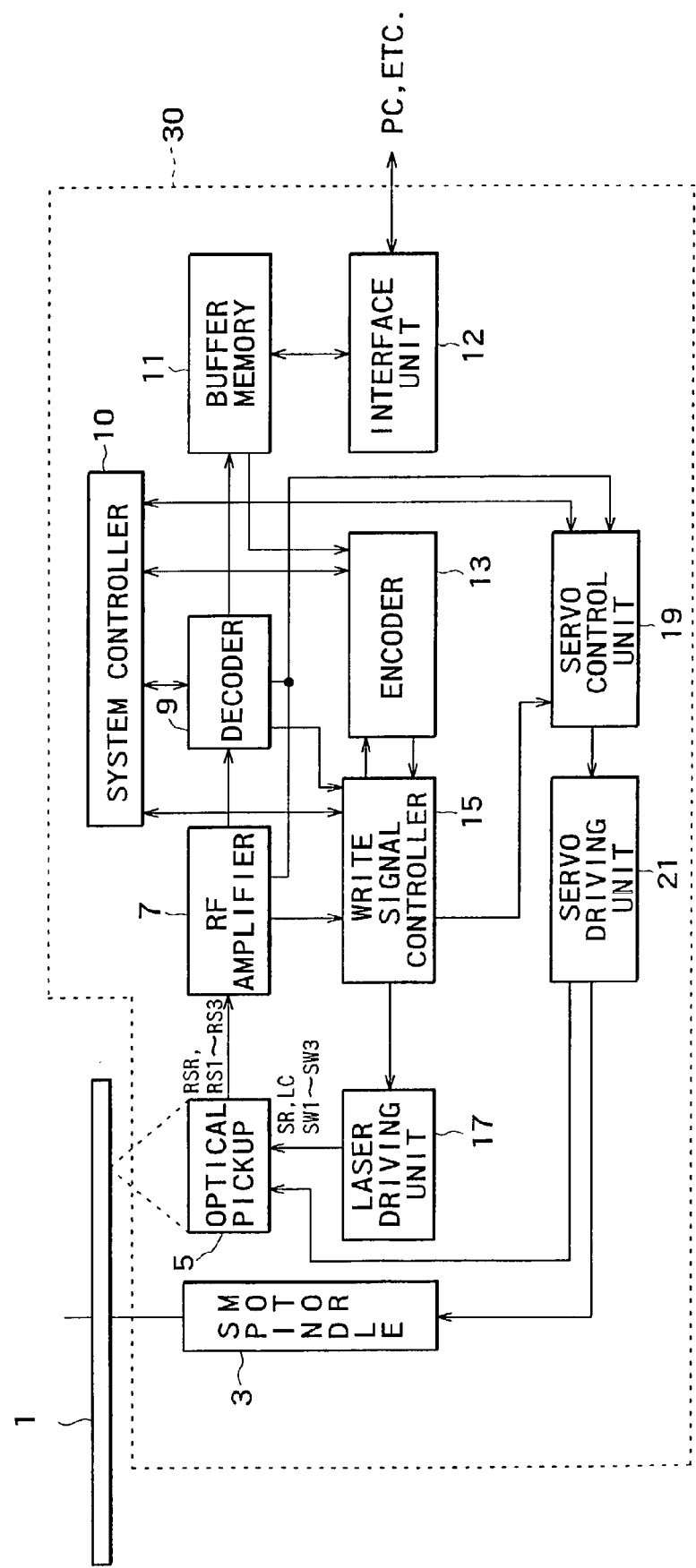
F I G. 1

DISK RECORDING APPARATUS AND DISK RECORDING METHOD

BACKGROUND OF THE INVENTION

The present invention relates to a method for recording data to a disk as well as to a disk recording apparatus for recording data based on that method.

In setups where data are written to a disk using a plurality of beams, data may be written to an unrecorded region that is scanned immediately before a given location where data have already been written by means of a beam. In such cases, it is preferred, for the purpose of recording data at high density with high precision, to write the data in such a manner that the end of the data to be written to the unrecorded region continues seamlessly and in a non-overlapping fashion to the beginning of the data in the ensuing recorded region.

Conventionally, however, it has been very difficult to match precisely on the disk the start of the data in any recorded region with the end of data to be recorded to an unrecorded region preceding that region.

At present, position data superposed on the wobbling grooves on the disk are read for use in determining where unrecorded regions exist on the disk surface. The retrieval of such position data allows for about a 10-percent read error, which does not contribute to improving accuracy.

Where the end of the data to be recorded is adjusted for data region coincidence on the basis of the position data mentioned above, any failure to read the position data correctly can result in a data overlap or a data gap with regard to the beginning of the data in recorded regions. The data overlap destroys what is already written in recorded regions. Both the data overlap and the data gap deviate from criteria for recording data properly to the disk and thereby incur the risk of failing to read data correctly from the disk.

If special regions called link regions are established between each recorded region and an unrecorded region, the data retrieved from the link regions during data read operations are regarded as unreliable and thus are not used. As a result, a significant amount of recording capacity is lost, much to the detriment of actually writing data to the disk.

SUMMARY OF THE INVENTION

The present invention has been made in view of the above circumstances and provides a method for recording data to a disk at high density with high precision, and a disk recording apparatus for recording data to the disk based on that method.

In carrying out the invention and according to a first aspect thereof, there is provided a disk recording apparatus for recording data to a disk, including: a reading and writing element for emitting a read beam onto the disk to read out recorded data therefrom while emitting a plurality of write beams simultaneously onto the disk to record data thereto in parallel; and a controlling element for controlling where to emit on the disk the plurality of write beams in accordance with the data read out by the reading and writing element.

The inventive structure outlined above allows data to be written with precision and in parallel to necessary regions on the disk by use of multiple write beams.

In one preferred structure according to the invention, the reading and writing element may further include: a beam-condensing element arranged to face the disk; a read beam emitting element for emitting the read beam onto the disk through the beam-condensing element; a plurality of write beam emitting elements for emitting the plurality of write beams onto the disk through the beam-condensing element; and a reading element for reading out the recorded data from the disk by detecting an intensity of light obtained by condensing the read beam reflected on the disk with the beam-condensing element.

The reading and writing element of the preferred structure above may carry out two processes in parallel: reading data from the disk by use of the read beam, and writing data to the disk using a plurality of write beams.

In another preferred structure according to the invention, the reading and writing element may further include: a beam-condensing element arranged to face the disk; a beam-emitting element for emitting a beam to the a beam-condensing element from the opposite side to the disk; beam-splitting element for splitting the beam emitted from the beam-emitting element into the read beam and the plurality of write beams, and emitting the read beam and the plurality of write beams onto the disk through the beam-condensing element; a beam dose adjusting element for adjusting a dose of each of the read beam and the plurality of write beams; and a reading element for reading out the recorded data from the disk by detecting an intensity of light obtained by condensing the read beam reflected on the disk with the beam-condensing element.

According to a second aspect of the invention, there is provided a disk recording method for recording data to a disk, including: a first step of emitting a read beam onto the disk to read out recorded data therefrom while emitting a plurality of write beams simultaneously onto the disk to record data thereto in parallel; and a second step where controlling where to emit on the disk the plurality of write beams in accordance with the data read out in the first step occurs.

The inventive method outlined above permits easy and reliable control over recording of data in parallel to the disk using multiple write beams.

In one preferred variation of the inventive method above, the first step may further include the steps of: emitting the read beam onto the disk through a beam-condensing element arranged to face the disk; reading out the recorded data from the disk by detecting an intensity of light obtained by condensing the read beam reflected on the disk with the beam-condensing element; and emitting the plurality of write beams onto the disk through the beam-condensing element.

In another preferred variation of the inventive method above, the first step may further include the steps of: emitting a beam to a beam-condensing element arranged to face the disk from the opposite side to the disk; splitting the emitted beam into the read beam and the plurality of write beams; adjusting a dose of each of the read beam and the plurality of write beams; emitting the read beam and the plurality of write beams adjusted in doses onto the disk through the beam-condensing element; and reading out the recorded data from the disk by detecting an intensity of light obtained by condensing the read beam reflected on the disk with the beam-condensing element.

The disk recording apparatus and disk recording method according to the invention allow data to be written precisely and in parallel to desired regions on the disk using a plurality of write beams, whereby high-density data recording is implemented at high speed with high precision on the disk.

The above and other objects, features and advantages of the present invention will become apparent from the following description and the appended claims taken in con-

BRIEF DESCRIPTION OF THE DRAWINGS

FIG. 1 is a block diagram showing an overall structure of a disk recording apparatus embodying this invention;

DETAILED DESCRIPTION OF THE PREFERRED EMBODIMENTS

Figure 2:
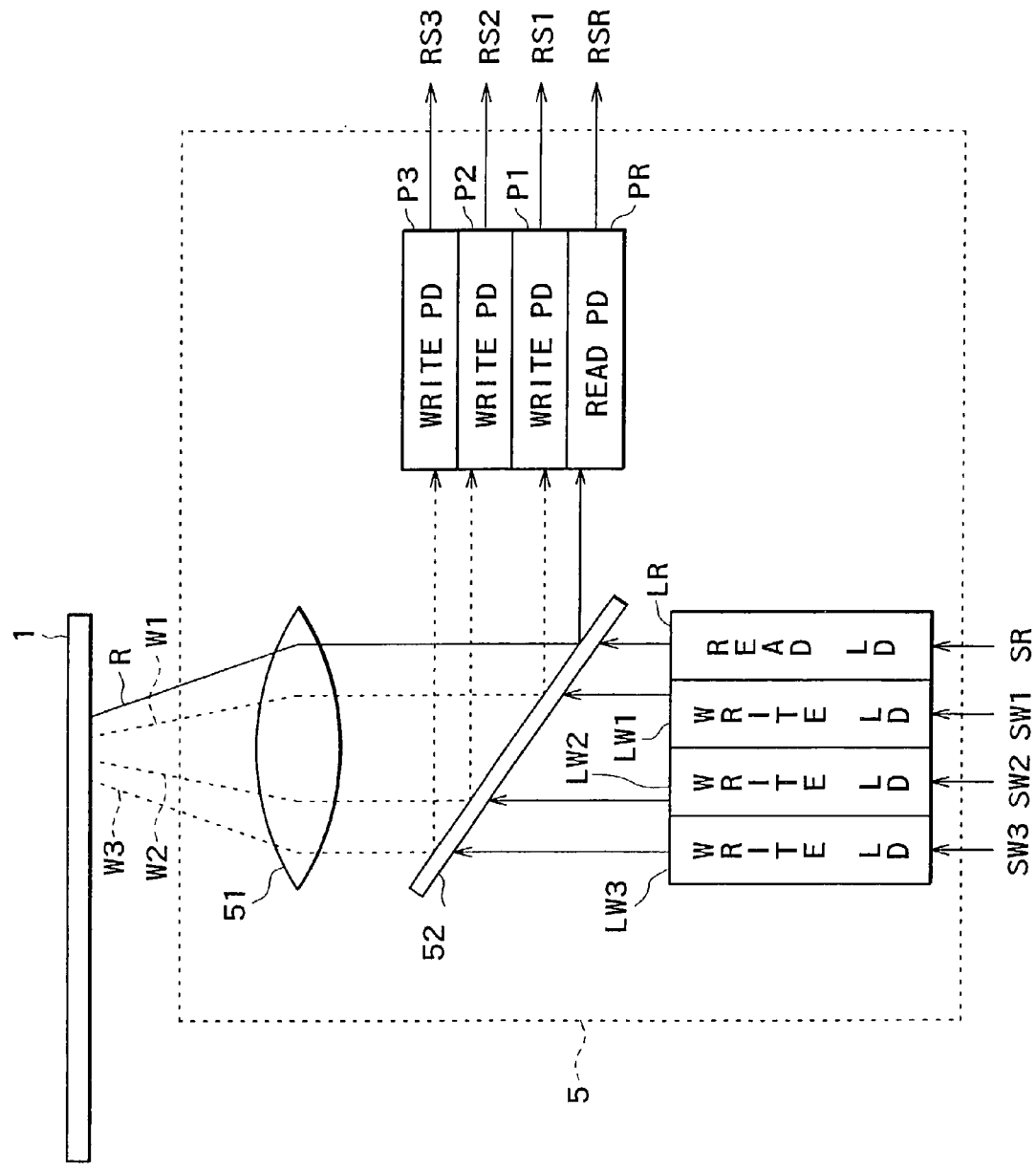
FIG. 2 is a schematic view depicting a first structure of the optical pickup shown in FIG. 1.

Preferred embodiments of this invention will now be described in detail with reference to the accompanying drawings. Throughout the drawings, like reference numerals designate like or corresponding parts.

FIG. 1 is a block diagram showing an overall structure of a disk recording apparatus 30 embodying this invention. As shown in FIG. 1, the disk recording apparatus 30 includes a spindle motor 3 for rotating an optical disk 1, an optical pickup 5, an RF amplifier 7, a decoder 9, a system controller 10, a buffer memory 11, an interface unit 12, an encoder 13, a write signal controller 15, a laser driving unit 17, a servo control unit 19, and a servo driving unit 21.

The spindle motor 3 is connected to the servo driving unit 21. The optical pickup 5 is connected to the servo driving unit 21 and the laser driving unit 17. The RF amplifier 7 is connected to the optical pickup 5, and the decoder 9 is connected to the RF amplifier 7. The system controller 10 is connected to the decoder 9, the encoder 13, the write signal controller 15, and the servo control unit 19.

The buffer memory 11 is connected to the decoder 9. The interface 12 is connected to the buffer memory 11 and an externally furnished personal computer (PC) or the like. The encoder 13 is connected to the buffer memory 11 and the write signal controller 15, which, in turn, is connected to the RF amplifier 7. The laser driving unit 17 is connected to the write signal controller 15. The servo control unit 19 is connected to the RF amplifier 7 and the decoder 9. The servo driving unit 21 is connected to the servo control unit 19.

The disk recording apparatus 30 of the above-outlined structure admits write data into the buffer memory 11 from the externally connected PC or the like through the interface unit 12, the write data being destined to be recorded to the optical disk 1. The write signal controller 15 writes the data to the optical disk 1 by controlling the laser driving unit 17 and the servo control unit 19 in accordance with the write data encoded by the encoder 13. The encoder 13, the write signal controller 15 and the servo control unit 19 operate in concert under the control of the system controller 10.

A signal read by the optical pickup 5 from the optical disk 1 is fed to the decoder 9 via the RF amplifier 7. After being decoded by the decoder 9, the signal is placed into the buffer memory 11.

FIG. 2 is a schematic view depicting a first structure of the optical pickup 5 shown in FIG. 1. As illustrated in FIG. 2, the optical pickup 5 includes a lens 51, a beam splitter 52, a read laser diode LR, write laser diodes LW1 through LW3, a read photodiode PR, and write photodiodes P1 through P3.

The lens 51 is furnished in a manner facing the optical disk 1 to which to write data. Each of the read laser diode LR and write laser diodes LW1 through LW3 emits a laser beam onto the lens 51.

The read laser diode LR emits a read beam R by which to read recorded data from the optical disk 1. The write laser diodes LW1 through LW3 respectively emit write beams W1 through W3 by which to write data to the optical disk 1. How these laser beams are controlled will be discussed later in more detail.

The beam splitter 52 is interposed between the four laser diodes (LD) on the one hand and the lens 51 on the other hand. The read photodiode PR and write photodiodes P1 through P3 are provided so as to receive reflected light beams from the beam splitter 52.

In the optical pickup 5 of the above-outlined structure, the read laser diode LR emits the read beam R onto the optical disk 1 via the beam splitter 52 and the lens 51. The write laser diodes LW1 through LW3 emit the write beams W1 through W3 to the optical disk 1 via the beam splitter 52 and the lens 51.

The laser beam emitted by the read laser diode LR is controlled in accordance with a control signal SR from the laser driving unit 17. The laser beams emitted by the write laser diodes LW1 through LW3 are controlled individually by use of the control signals SW1 through SW3 from the laser driving unit 17. That is, the write laser diodes LW1 through LW3 write data in parallel to the optical disk 1 by controlling in intensity the emitted write beams W1 through W3 in accordance with the control signals SW1 through SW3.

The read beam R and the write beams W1 through W3 are reflected by the optical disk 1 before entering the beam splitter 52 through the lens 51. For purpose of simplification and illustration, FIG. 2 shows the reflected light paths not as they actually occur but in a simply sketched fashion. The same applies to what is shown in FIG. 3, to be discussed later.

In the above setup, the laser beams are reflected by the beam splitter 52. The read beam R is then received by the read photodiode PR while the write beams W1 through W3 are received by the write photodiodes P1 through P3. In turn, the read photodiode PR generates a signal RSR reflecting the amount of the light received, before supplying the signal RSR to the RF amplifier 7. The write photodiodes P1 through P3 generate signals RS1 through RS3 reflecting the amounts of the light received, before feeding the signals RS1 through RS3 to the RF amplifier 7.

Figure 3:
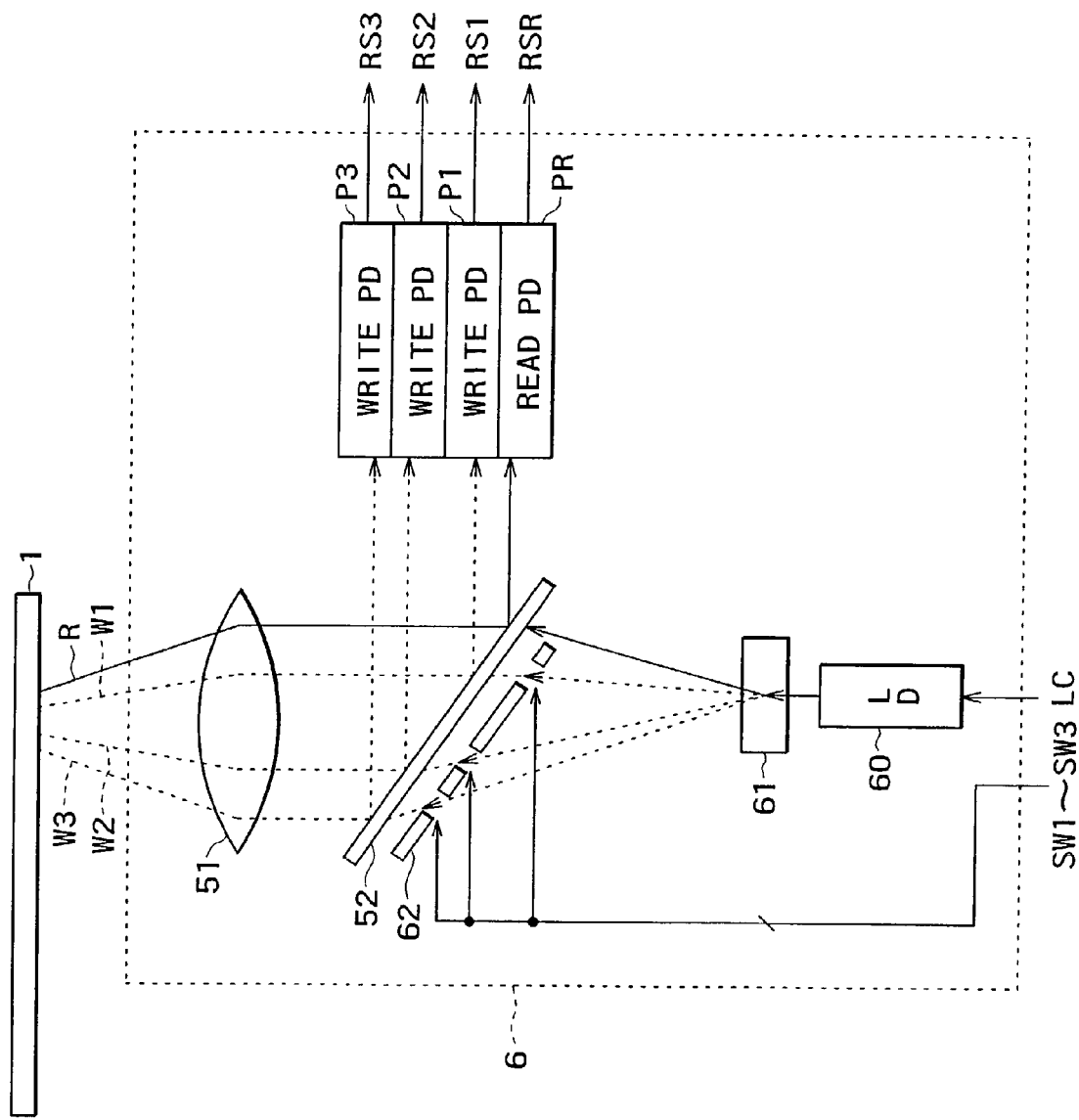
FIG. 3 is a schematic view illustrating a second structure of the optical pickup shown in FIG. 1.

The optical pickup 5 may be replaced by an alternative optical pickup 6 having a second structure shown in FIG. 3. As depicted in FIG. 3, the optical pickup 6 has basically the same structure as the optical pickup 5 of FIG. 2. The differences are that the beam splitter 52 is furnished with a liquid crystal shutter 62 and the read laser diode LR and write laser diodes LW1 through LW3 are replaced by a laser diode 60 and a diffraction grating 61.

In the optical pickup 6 of the above-outlined structure, the laser diode 60 emits a single laser beam based on a control signal LC supplied by the laser driving unit 17. The emitted laser beam is diffracted by the diffraction grating 61. The liquid crystal shutter 62 opens and shuts three optical paths independently in accordance with the control signals SW1 through SW3 supplied illustratively by the laser driving unit 17.

In the above setup, the laser diode 60 controls in intensity the emitted laser beam in accordance with the control signal LC, and the openings of the liquid crystal shutter 62 are regulated in keeping with the control signals SW1 through SW3. The arrangements permit independent control of the write beams W1 through W3 in intensity, whereby data are written in parallel to the optical disk 1.

Figure 4:
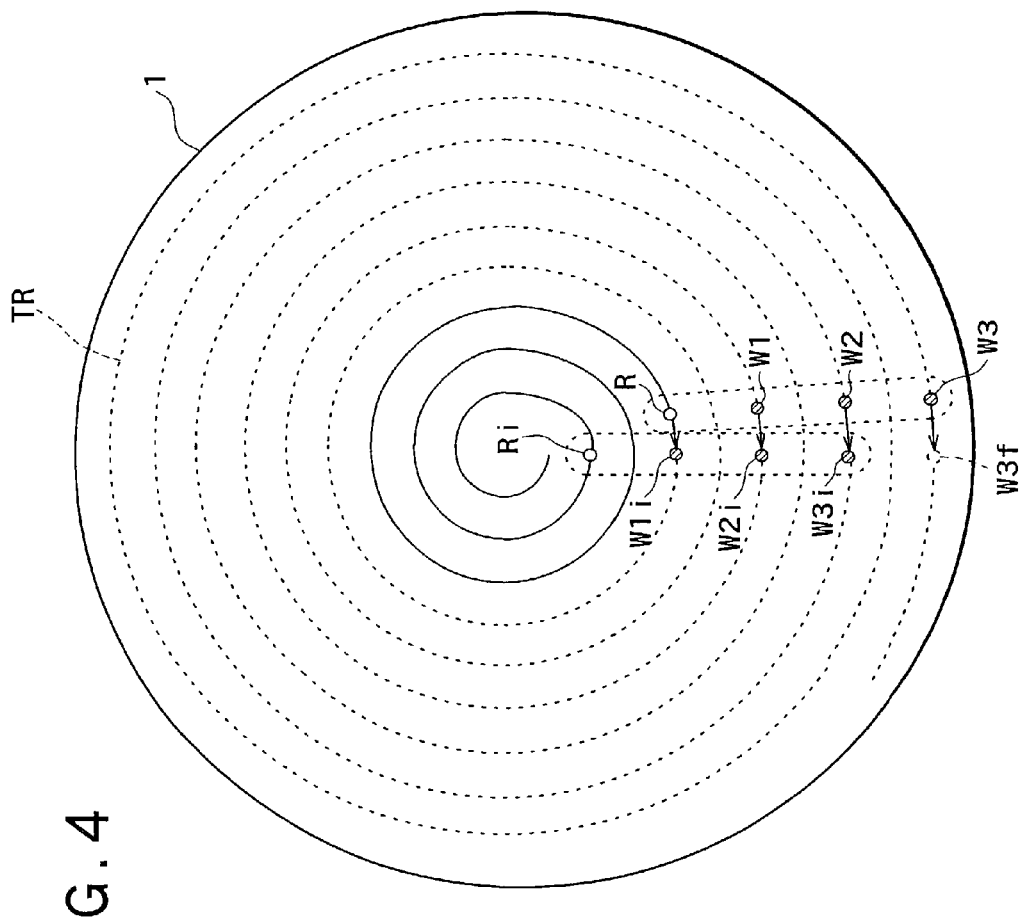
FIG. 4 is an explanatory view explaining how the disk recording apparatus of FIG. 1 typically operates.

Described below with reference to FIG. 4 is how the disk recording apparatus 30 embodying the invention typically operates. In FIG. 4, illustratively, the three write beams W1 through W3 that are shown are to be used to write data in parallel to the optical disk 1 where tracks TR are formed in spiral fashion. Unrecorded tracks are indicated by broken lines. It should be noted that the number of write beams is not limited to three; the invention applies irrespective of the number of beams in use. In FIG. 4, the read beam R and the write beams W1 through W3 are shown two tracks apart from one another. However, this is not limitative of the invention; the invention applies regardless of how far apart the beams are from one another.

The tracks TR indicated by solid lines in FIG. 4 are those where data have already been written. To write data seamlessly to an unrecorded track following a given recorded track, the write signal controller 15 establishes, at the end of the recorded track in question, an initial location W1i for the write beam W1 that is on the radially innermost side in accordance with data retrieved from the disk using the read beam R. The write signal controller 15 then scans the spiral track TR with the read beam R illustratively in the clockwise direction starting from an initial location Ri, so as to read recorded data from the scanned track. Simultaneously, the write signal controller 15 scans the tracks TR with the write beams W1 through W3 clockwise starting from the respectively established initial locations W1i through W3i, so as to write data in parallel to the disk.

The retrieved data above may be constituted by address information held on a track TR or by other information that already exists on the track in question. That is, the write signal controller 15 illustratively starts writing data from the location designated by an address retrieved by use of the read beam R and scans the track by the amount corresponding to predetermined address information. Alternatively, the write signal controller 15 may retain the data already written to the optical disk 1 and compare the retained data with the data retrieved using the read beam R to determine a write start location and a write end location.

As data are being written in parallel by scanning the spiral tracks TR with multiple write beams W1 through W3, two complete turns of scan allow the write beams W1, W2 and W3 to reach the initial locations W2i, W3i and W3f, respectively, because of the fact that the write beams W1 through W3 are two tracks apart from one another.

At that point, the write signal controller 15 recognizes that the scan has reached the initial location W1i based on the data retrieved by the read beam R. Then the write signal controller 15 temporarily stops its write operation.

When continuously writing data to other tracks TR, not shown, the write signal controller 15 moves the read beam R and write beams W1 through W3 collectively in such a manner that the write beam W1 coincides with a new write start location and resumes the scan. Illustratively, if data are to be written to tracks radially outside of the location W3f, the write signal controller 15 moves the read beam R and write beams W1 through W3 collectively so that read beam R and write beam W1 reach the initial location W3i and the location W3f, respectively. The tracks are then scanned with these beams in the clockwise direction.

As described, the disk recording apparatus 30 according to the invention writes data in parallel to the optical disk 1 with a plurality of beams by having the scanning locations of the write beams W1 through W3 determined based on the data read by the read beam R. This structure makes it possible to record data to the optical disk 1 in non-overlapping and contiguous fashion between storage regions, whereby high-density data recording is accomplished.

Although the disk recording apparatus 30 of the invention was described above as writing data to the storage medium composed of the optical disk 1, this is not limitative of the invention. Alternatively, the storage medium may be the magneto-optical disk as well as the phase-change recording type optical disk and other diverse storage media having tracks TR to which data may be written by a scanning operation of the optical pickup 5.

As many apparently different embodiments of this invention may be made without departing from the spirit and scope thereof, it is to be understood that the invention is not limited to the specific embodiments thereof except as defined in the appended claims.

What is claimed is:

1. An optical disk recording apparatus for recording data to an optical disk, comprising:
   an optical disk recording medium wherein data is recorded in one or more spiral tracks,
   reading means for emitting a read beam onto said disk that operates exclusively at a first power level sufficient to read data from the optical disk and insufficient to record new data on the optical disk,
   writing means for emitting a plurality of write beams onto said disk that operate exclusively at a second power level sufficient to read data from the optical disk as well as record new data on the optical disk, and
   means for directing the read beam and write beams simultaneously onto the surface of the optical disk,
   wherein each of the beams is directed to a respective location on the optical disk, said locations being disposed collinearly along a radius of the optical disk and having a fixed, uniform spacing therebetween, said spacing corresponding to a spacing between respective tracks on the optical disk, and the read beam is constrained to be directed toward the innermost of said locations with respect to the radius of the optical disk.

2. The optical disk recording apparatus of claim 1, further comprising:
   means for independently capturing the reflected intensity of each of the beams as reflected from the surface of the optical disk to reproduce data recorded thereon.

3. The optical disk recording apparatus of claim 2, further comprising:
   a read signal for controlling the operation of read beam; and
   separate write signals for independently modulating the operation of each of the writing beams;
   wherein all of the write beams are activated concurrently with a first data being read from the optical disk by the read beam and all of the write beams are deactivated concurrently with a second data being read from the optical disk by the read beam.

4. The optical disk recording apparatus of claim 3, further comprising:
   a laser diode;
   a diffraction grating disposed between the laser diode and the optical disc; and
   a liquid crystal shutter disposed between the diffraction grating and the optical disc;
   wherein the laser diode emits a laser that is diffracted by the diffraction grating to form the read beam and the write beams,
   wherein the write beams pass through the liquid crystal shutter, wherein the write signals modulate the write beams by activating portions of the liquid crystal shutter in accordance with the write signals to record information on the optical disk.

5. A disk recording method for recording data to an optical disk, comprising:
- a first step of emitting a read beam onto an optical disk to read out recorded data from said disk and determine a first read location on the optical disk at which a new data recording can begin,
- wherein said read beam operates only at a first power level sufficient to read data from the optical disk and insufficient to record new user data on the optical disk;
- a second step of directing the read beam to a second read location on the optical disk where user data has previously been recorded;
- a third step of emitting a plurality of write beams onto said disk in parallel with said read beam,
- wherein said write beams operate only at a second power level sufficient to read data from the optical disk and record new data on the optical disk,
- wherein said write beams are directed towards respective write locations on the optical disk, said locations being disposed collinearly along a radius of the optical disk and having a fixed, uniform spacing there between, said spacing corresponding to a spacing between respective tracks on the optical disk, and said locations having a fixed positional relation to the location of the read beam,
- wherein the radially innermost write location is aligned with the first read location;
- a fourth step of concurrently activating all of the write beams and recording, with all of the write beams in parallel, new user data to the optical disk while the read beam simultaneously scans the previously recorded user data; and
- a fifth step of concurrently deactivating all of the write beams, said deactivation corresponding with the read beam scanning the first read location again.

6. The disk recording method of claim 5, wherein the data recorded in parallel by the plurality of write beams forms a single continuous spiral track on the optical disk.

* * * * *